(12) United States Patent
Gaddy (10) Patent No.: US 8,108,016 B2
(45) Date of Patent: Jan. 31, 2012

(54) PORTABLE COMMUNICATION DEVICE HAVING A DUAL SLIDING FLIP HINGE ASSEMBLY

(75) Inventor: David W. Gaddy, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 580 days.

(21) Appl. No.: 12/192,211

(22) Filed: Aug. 15, 2008

(65) Prior Publication Data

US 2010/0037428 A1 Feb. 18, 2010

(51) Int. Cl.
*H04M 1/00* (2006.01)
(52) U.S. Cl. ............... 455/575.4; 455/575.1; 455/575.3; 455/566; 455/90.3; 455/550.1; 379/433.01; 379/433.04; 379/433.11; 379/433.12; 379/433.13; 16/223; 16/327; 16/366; 361/679.06; 361/679.07; 361/679.08; 361/679.11; 361/679.26
(58) Field of Classification Search ............... 455/575.1, 455/575.3, 575.4, 566, 90.3; 379/433.01, 379/433.04, 433.11, 433.12, 433.13, 327, 379/366; 361/679.06, 679.07, 679.08, 679.11, 361/679.26, 679.29, 679.39; 16/223, 327, 16/366; D14/507, 137, 138, 140
See application file for complete search history.

(56) References Cited

U.S. PATENT DOCUMENTS

| | | | | |
|---|---|---|---|---|
| 6,539,208 B1 * | 3/2003 | Mori | .......................... | 455/575.3 |
| 7,110,797 B2 * | 9/2006 | Soejima | .................... | 455/575.1 |
| 7,269,450 B2 * | 9/2007 | Lee et al. | .................... | 455/575.1 |
| 7,376,450 B2 * | 5/2008 | Chen | .......................... | 455/575.4 |
| 7,492,891 B2 * | 2/2009 | Eldon | ...................... | 379/433.12 |
| 7,577,466 B2 * | 8/2009 | Kim | ........................... | 455/575.4 |
| 7,813,776 B2 * | 10/2010 | Lee et al. | .................... | 455/575.4 |
| 2003/0103041 A1 * | 6/2003 | Nguyen et al. | ................ | 345/168 |
| 2005/0054393 A1 * | 3/2005 | Fagerstrom et al. | ....... | 455/575.1 |
| 2006/0105824 A1 | 5/2006 | Kim et al. | | |
| 2006/0135222 A1 | 6/2006 | Kim | | |
| 2007/0049376 A1 * | 3/2007 | Cho et al. | ........................ | 463/46 |
| 2008/0261659 A1 * | 10/2008 | Jang et al. | ..................... | 455/566 |

FOREIGN PATENT DOCUMENTS

| | | |
|---|---|---|
| EP | 1 845 696 | 10/2007 |
| EP | 1 887 762 | 2/2008 |
| EP | 1 950 937 | 7/2008 |

OTHER PUBLICATIONS

International Search Report and Written Opinion for International Application No. PCT/US2009/034063 dated Apr. 28, 2009.
International Preliminary Report on Patentability from corresponding International Application No. PCT/US09/34063.

* cited by examiner

*Primary Examiner* — Olumide T Ajibade Akonai
(74) *Attorney, Agent, or Firm* — Renner, Otto, Boisselle & Sklar, LLP (57) ABSTRACT

A portable communication device includes a base assembly, a flip assembly and an intermediate assembly operatively coupled to the base assembly and the flip assembly by a dual sliding flip hinge assembly. The dual sliding flip hinge assembly is configured to facilitate sliding motion of the intermediate assembly along a first direction and along a second direction that is perpendicular to the first direction. The dual sliding flip hinge assembly further facilitates rotation of the intermediate assembly upon sliding along the second direction. The base assembly, flip assembly and intermediate assembly may be configured to include respective displays and/or touch-input devices to provide a portable communication device with increased display area and/or control area with a smaller footprint often associated with conventional clamshell or slider portable communication devices.

15 Claims, 5 Drawing Sheets

PORTABLE COMMUNICATION DEVICE HAVING A DUAL SLIDING FLIP HINGE ASSEMBLY

TECHNICAL FIELD OF THE INVENTION

The present invention relates generally to portable communication devices, and more particularly, to a portable communication device having a dual sliding flip hinge assembly.

DESCRIPTION OF RELATED ART

Portable communication devices, and in particular mobile telephones, are used for a wide variety of applications. For example, mobile phones are used not only for phone conversations and for sending/receiving messages, but also for browsing the internet, viewing multimedia content, such as movies or music, and for playing games, etc.

In general, the display screen on a mobile phone is limited by the size of the phone. As mobile phones are reduced in size, the surface area available for the display screen, functional keys and a keypad is reduced. In order to maximize the size of the display screen, some mobile devices are designed with a base and a display that is movable relative to the base. In these mobile phones, the keypad often is incorporated into the base and exposed only after opening/moving the display. Known mobile devices of this variety include clamshell devices, in which the display is connected to the base via a conventional rotational hinge, and slider devices, in which the display is slidable with respect to the base, for example, on a rail or a track.

SUMMARY

To enhance functionality and versatility, a portable communication device is provided with a dual sliding hinge assembly. The dual sliding hinge assembly is configured to couple an intermediate assembly to a base assembly and a flip assembly such that the intermediate portion can slide relative to the base assembly and the flip assembly along a first direction and along a second direction perpendicular to the first direction. The dual sliding hinge assembly also is configured to facilitate rotation of the intermediate assembly when the intermediate assembly is slid along the second direction. The base assembly, intermediate assembly and/or flip assembly may be configured to include touch-input devices and/or display devices. The provision of a dual sliding hinge assembly allows for a mobile phone that has the look and feel of a larger phone with more display area and/or control area with a smaller footprint.

One aspect of the disclosed technology relates to a portable communication device that includes a base assembly; a flip assembly coupled to the base assembly such that the flip assembly is rotatable relative to the base assembly; and an intermediate assembly operatively coupled to the base assembly and the flip assembly by a dual sliding hinge assembly, wherein the dual sliding hinge assembly is configured to facilitate sliding movement between the intermediate assembly and the base assembly along a first direction and along a second direction perpendicular to the first direction.

According to another aspect, the dual sliding hinge assembly is configured to facilitate rotational movement between the intermediate assembly and the base assembly.

According to another aspect, the dual sliding hinge assembly is configured to facilitate rotational movement between the intermediate assembly and the base assembly when the intermediate assembly is slid along the second direction.

According to another aspect, the dual sliding hinge assembly includes a first hinge plate coupled to a second hinge plate and configured for sliding movement between the second hinge plate and the first hinge plate along the first direction.

According to another aspect, the dual sliding hinge assembly includes a third hinge plate coupled to the second hinge plate and configured for sliding motion between the third hinge plate and the second hinge plate along a second direction perpendicular to the first direction.

According to another aspect, the dual sliding hinge assembly includes a fourth hinge plate coupled to the third hinge plate and configured for rotational movement between the fourth hinge plate and the third hinge plate.

According to another aspect, the fourth hinge plate is coupled to the third hinge plate by a spring hinge.

According to another aspect, the fourth hinge plate is rotatable to an angle of up to about 90 degrees.

According to another aspect, the intermediate assembly includes at least one display.

According to another aspect, the intermediate assembly includes a touch-input device that is revealed when a portion of the intermediate assembly is slid along the second direction.

According to another aspect, the base assembly and the flip assembly each comprise a touch-sensitive input device.

According to another aspect, each touch-sensitive input device is a touch-sensitive display.

According to another aspect, the portable communication device is a mobile telephone.

Another aspect of the disclosed technology relates to a portable communication device that includes a base assembly; a flip assembly; and an intermediate assembly; wherein the base assembly, the intermediate assembly and the top assembly are operatively coupled by a dual hinge assembly, wherein the dual hinge assembly is configured to facilitate rotational movement between the base assembly and the flip assembly, sliding movement between the base assembly and the intermediate assembly along a first direction and along a second direction perpendicular to the first direction, and rotational movement of the intermediate assembly relative to the base assembly when the intermediate assembly is slid along the second direction.

Another aspect of the disclosed technology relates to a dual sliding hinge assembly for use in connection with a portable communication device, where the dual sliding hinge assembly includes a first hinge plate coupled to a second hinge plate and configured for sliding movement between the second hinge plate and the first hinge plate along a first direction; a third hinge plate coupled to the second hinge plate and configured for sliding motion between the third hinge plate and the second hinge plate along a second direction perpendicular to the first direction; and a fourth hinge plate coupled to the third hinge plate and configured for rotational movement between the fourth hinge plate and the third hinge plate.

According to another aspect, the dual sliding hinge assembly is configured to facilitate rotation of the fourth hinge plate of about 90 degrees relative to the third hinge plate.

Another aspect of the disclosed technology relates to a portable communication device that includes a first assembly; and a second assembly coupled to the first assembly by a dual sliding hinge assembly; wherein the dual sliding hinge assembly is configured to facilitate sliding movement between the base assembly and the intermediate assembly along a first direction and along a second direction perpendicular to the first direction, and rotational movement of the intermediate assembly relative to the base assembly when the intermediate assembly is slid along the second direction These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

As referred to herein, the term "portable communication device" includes portable radio communication equipment. The term "portable radio communication equipment", which herein after is referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like.

In the context of the illustrated embodiments, the portable communication device is primarily referred to as a mobile telephone or a mobile phone. The description and illustrations of the mobile telephone, however, are intended to serve as a non-limiting exemplary environment for the inventive concepts described herein, and it will be appreciated that the invention is not intended to be limited to a mobile telephone, but rather can be any type of electronic equipment.

Mobile phone designers struggle with phone size over function and convenience. In one respect, mobile phones having smaller footprints are desirable for their portability. Examples of such phones include phones having a clamshell form factor in which a top portion of the phone rotates between open and closed positions relative to the base, which typically includes a keypad. Another example of a phone having a smaller form factor is a "slider phone." Mobile phones with slider hinges typically include a keypad on the base that is exposed by sliding the display relative to the base. Functional keys, typically located on the same surface as the display, are used for navigating menus and for initiating various functions on the device. Due to the location of the functional keys, the surface area available for the display screen is reduced, thus requiring the display screen to also be reduced in size. Furthermore, when the display is slid open, the functional keys are slid away from the user's hands, making them generally difficult to reach and/or inconvenient to use.

The smaller footprint associated with slider phones and clamshell phones often limits the phone's utility for multimedia applications, such as text messaging, surfing the web and/or gaming operations. Larger phones (e.g., phones having larger display areas and/or control areas) provide better functionality for multimedia applications, but are more cumbersome for user's to carry around.

The present disclosure recognizes shortcomings with conventional portable communication devices, including slider mobile phones and clamshell phones, as well as larger phones, and provides a portable communication device (e.g., a mobile phone) having a dual sliding hinge assembly. The dual sliding hinge assembly may be configured to slidingly couple an intermediate assembly to a base assembly and a flip assembly such that the intermediate assembly may be slid along a first direction and along a second direction perpendicular to the first direction. In addition, the dual sliding hinge assembly is configured to facilitate rotation of the intermediate assembly after the intermediate assembly is slid along the second direction. The provision of a dual sliding flip hinge assembly allows for a mobile phone that has the look and feel of a larger phone with more display area and/or control area and greater versatility and configurability with the smaller footprint often associated with slider and/or clamshell phones.

Figure 1:
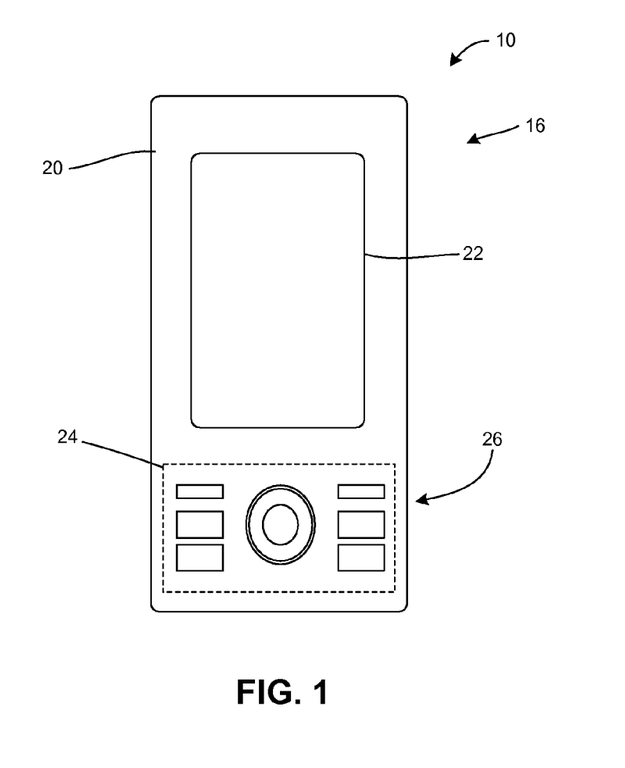
FIG. 1 is a top view of an exemplary portable communication device, such as a mobile telephone in a closed position.
Figure 2:
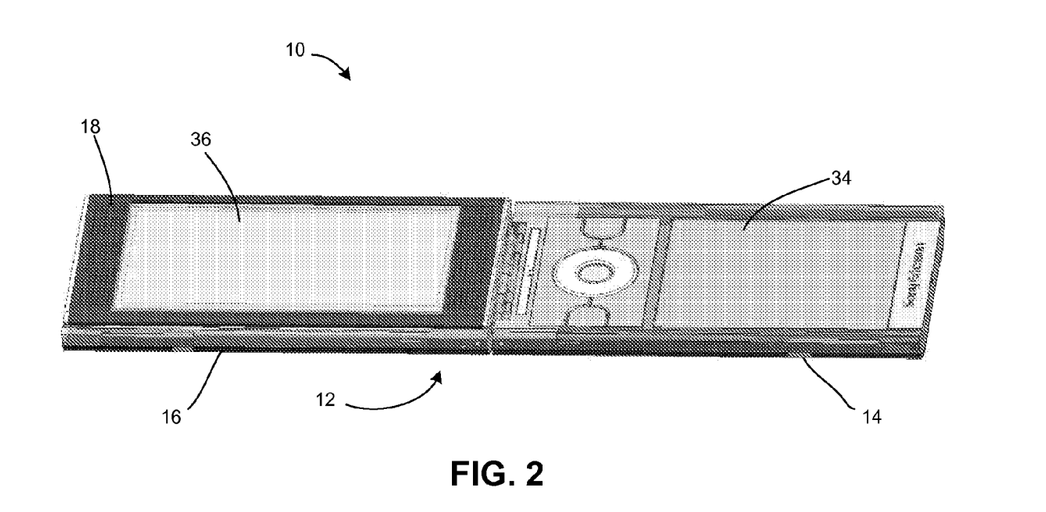
FIG. 2 is a top perspective view of the mobile telephone of FIG. 1 in an open position.

Referring initially to FIG. 1 and FIG. 2, an exemplary embodiment of a portable communication device 10 (e.g., a mobile phone, mobile terminal or the like) is shown as it would appear when operating in what is conventionally referred to as a "standby" mode. As is described more fully below, the mobile phone 10 includes a dual sliding hinge assembly 12 (also referred to as a dual hinge assembly or simply as a hinge assembly). The dual sliding hinge assembly is configured to couple a base assembly 14 and a flip assembly 16 to an intermediate assembly 18 such that the intermediate assembly is slidable relative to the base assembly 14 and the flip assembly 16 along a first direction, a along a second direction perpendicular to the first direction and rotatable when slid along the second direction.

In the illustrated exemplary embodiment, FIG. 1 shows a top portion of the flip assembly 16 that would be exposed when the mobile phone is in a closed configuration. As shown, the top portion 20 of the flip assembly 16 includes an outer display 22, for example, a display that may be viewed when the phone is in a closed position and/or in a standby mode. In addition, the top portion 20 of the flip assembly 16 may include or otherwise define a touch-sensitive input area 24 (e.g., a touch-input display or other touch-input control area). In the illustrated exemplary embodiment, the touch-sensitive area 24 is configured to provide functional and/or navigational keys 26. It will be appreciated, that in an alternative embodiment, the top portion of the first assembly may be equipped without an outer display and/or without a touch-sensitive input area without departing from the scope of the present invention.

The functional and/or navigational keys 26 may provide for a variety of user input operations. For example, the functional keys 26 typically include special function keys, such as a "call send" key for initiating or answering a call, and a "call end" key for ending or "hanging up" a call. Special function keys also may include menu navigation keys, for example, for navigating through a menu displayed on the display(s) to select different telephone functions, profiles, settings, etc., as is conventional. Other navigational keys or controls may include directional keys (e.g., up, down, left, and right) to highlight different links, or icons, or to navigate text or other documents, etc. The navigational controls 24 also may be in the form of a roller ball or navigational ball, as will be appreciated. Other keys associated with the mobile telephone may include a volume key, an audio mute key, an on/off power key, a web browser launch key, a camera key and the like. The navigational keys may be embodied as "hard keys" or "soft keys" implemented on a touch-sensitive input device.

The outer display 22 (e.g., a touch screen) is configured to display information to a user, such as, operating state, time, telephone numbers, contact information, menus, etc. The user also can view and utilize various features and functions related to the various operating states of the mobile phone 10 on the display 22. The display 22 also may be used to visually display content received by the mobile telephone 10 and/or retrieved from a memory of the mobile telephone 10. For example, the user can watch movies, play video games, and browse the internet, etc., on the screen. Such audio/video materials may be stored on memory within the phone or accessed from remote servers, as will be appreciated.

Figure 3:
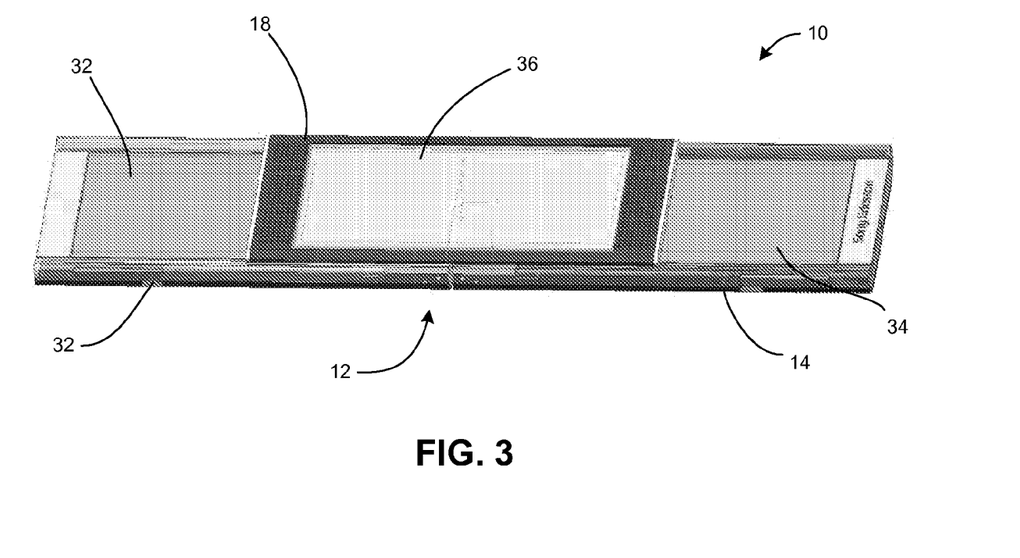
FIG. 3 is a top perspective view of the mobile telephone of FIG. 2 in an open position with the intermediate assembly slid along a first direction.
Figure 4:
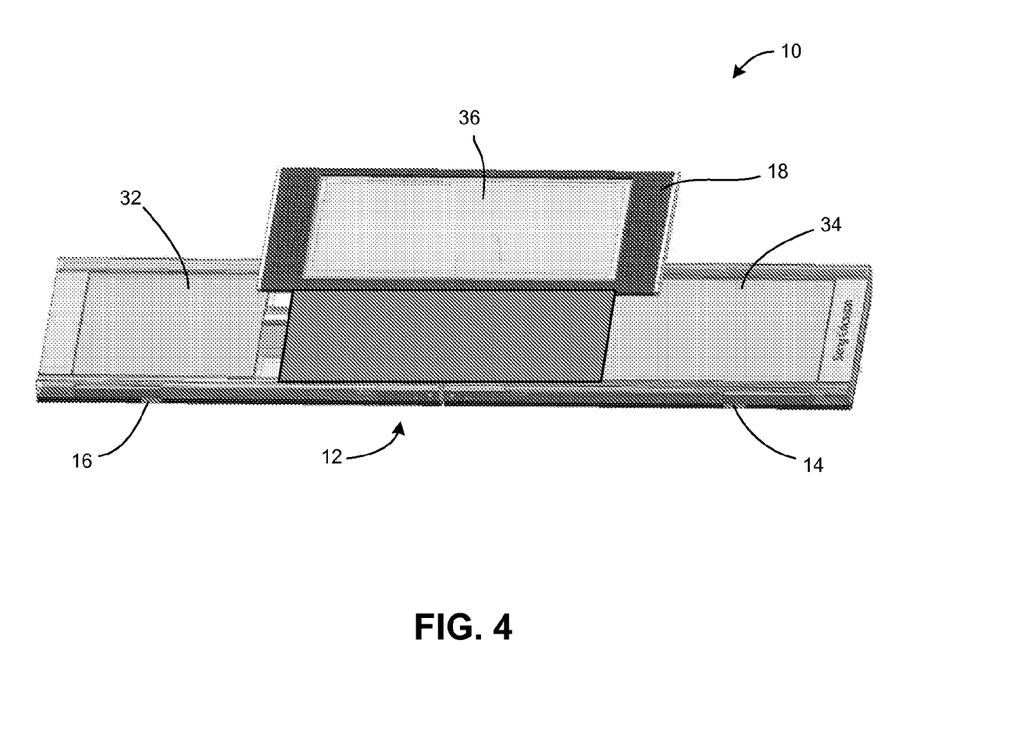
FIG. 4 is a top perspective view of the mobile telephone of FIG. 3 with the intermediate assembly slid along a second direction.

As shown in FIGS. 2-6, an described more fully below, the mobile phone 10 includes a base assembly 14 and a flip assembly 16 that are rotationally coupled together (e.g., by a spring hinge or by a portion of the dual sliding hinge assembly 12), such that the flip assembly 16 may be rotated relative to the base assembly 14 (e.g., such that the flip assembly may be opened or closed). In addition, the base assembly 14 and the flip assembly 16 are operatively coupled to the intermediate assembly 18 by the dual sliding hinge assembly 12 such that the intermediate assembly 18 may be slid or otherwise laterally translated relative to the base assembly 14 and the flip assembly 16 when the flip assembly is rotated to a completely open position (e.g., a position where the flip assembly is at an angle of about 180 degrees relative to the base assembly). More particularly, as is shown in FIG. 3 and FIG. 4, the dual sliding hinge assembly 12 is configured such that the intermediate assembly 18 may be slid or otherwise translated along a first direction (e.g., along the direction indicated by arrow A) as well as being slid or otherwise laterally translated along a second direction (e.g., along the direction indicated by arrow B) in a direction perpendicular to the first direction. As shown in FIG. 3 and FIG. 4, the dual sliding hinge assembly facilitates sliding of the intermediate assembly from a position substantially over the flip assembly 16 to a position partially over the flip assembly and partially over the base assembly. Further, once the intermediate assembly is relatively centered over the flip assembly and the base assembly, the dual sliding hinge assembly facilitates sliding or lateral motion of the intermediate assembly along the second direction. In one exemplary embodiment, the mobile phone is configured such that the intermediate assembly includes or otherwise houses an auxiliary assembly 30 (e.g., a dedicated keypad or a touch-sensitive input device, such as a dynamic keypad).

Figure 5:
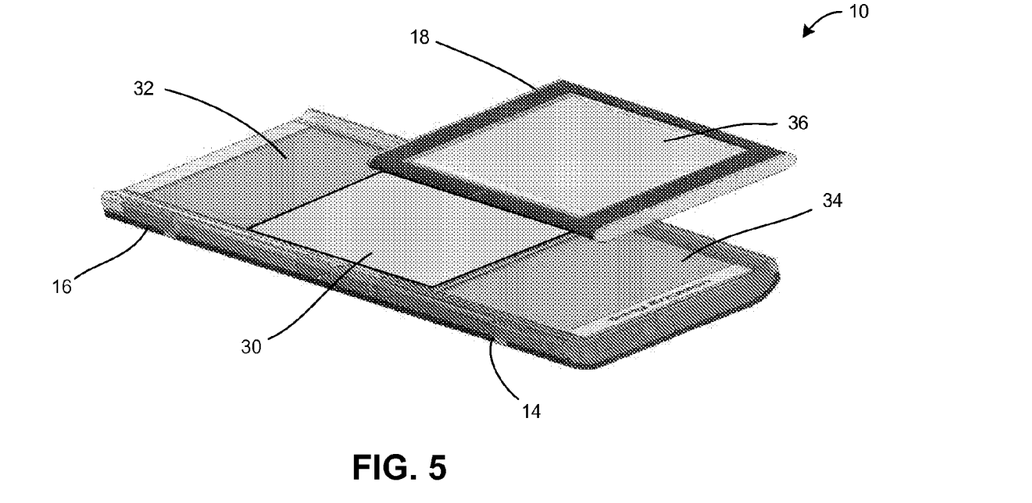
FIG. 5 is a perspective view of the mobile telephone of FIG. 3 with the intermediate assembly slid along a second direction.
Figure 6:
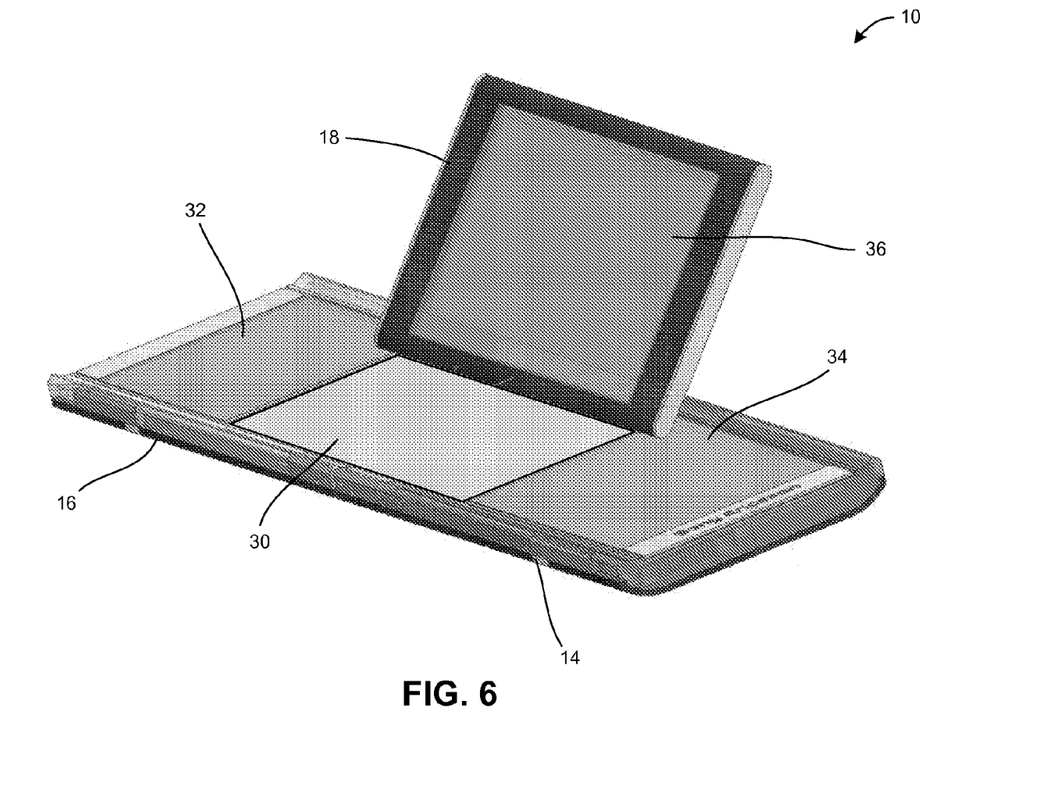
FIG. 6 is a perspective view of the mobile telephone of FIG. 5 with the intermediate assembly slid along a second direction and rotated.

Referring now to FIG. 5 and FIG. 6, the dual sliding hinge assembly 12 is configured to facilitate rotation of the intermediate assembly 18 (or at least a portion of the intermediate assembly) once the intermediate assembly has been slid or otherwise laterally translated along the second direction. Alternatively, the intermediate assembly may be rotated with sliding of the intermediate assembly along the second direction. As shown in FIG. 6, the intermediate assembly may then by rotated into a relatively upright position (e.g., rotated about an angle of up to about 90 degrees relative to the plane of the base assembly and the flip assembly when the base assembly and the flip assembly are in a fully open position). In this embodiment, the auxiliary area 30 may also be revealed and/or utilized by a user of the phone. As can be seen in FIG. 6, the provision of a dual sliding hinge assembly that also facilitates rotation of the intermediate assembly allows the phone to be configured into a laptop-like configuration, which a user may find useful for a variety of applications, such as web browsing, text entry, messaging, gaming and the like.

In the exemplary embodiment illustrated in FIGS. 2-6, the flip assembly includes a first touch-sensitive input device 32 (e.g., a touch-sensitive display or touch screen). Similarly, the base assembly may be configured to include another touch-sensitive input device 34 (e.g., a touch-sensitive display or touch screen). In one embodiment, the intermediate assembly 18 may also include or otherwise house a touch-sensitive display or touch screen 36. Alternatively, the intermediate assembly 18 may simply include a conventional display.

In one embodiment, touch-sensitive input devices 32, 34 and 36 each are touch-sensitive displays or touch screens. Exemplary touch screens include thin film transistor (TFT) LCD screens. It will be appreciated that different screens, such as larger or smaller screens, or other thin screen technology may be utilized without departing from the scope of the present invention.

If the mobile phone includes touch screens, the screens may be navigated by using a stylus or by otherwise touching the surface of the screen to select various functions and/or to input information or data into the phone. As is described more fully below, keys or key-like functionality also may be embodied as a touch screen on the display screen, and it will be appreciated that in such embodiments, the functional and/ or navigational keys may be incorporated into the touch screen to incorporate a larger screen on the display.

In the illustrated embodiment, the base assembly 14 also houses a battery 50 operatively coupled to a main printed circuit board assembly (PCBA), which includes the electronics, memory, and circuitry, etc., necessary for operating the mobile phone 10, including conventional call circuitry that enables the mobile telephone 10 to establish a call or otherwise exchange signals other devices, such as other mobile devices, internet web servers, media servers, or the like. The call circuitry also may be responsible for transmitting and receiving text messages, emails, or text documents. Additionally, the mobile phone 10 may include circuitry for browsing the internet, playing or viewing audio/visual materials, such as picture, music or video files and for gaming operations. Circuitry that controls the touch-sensitive input devices 32, 34 and 36 also is included. In one embodiment, the display control circuitry dynamically adapts the displayed output of the touch-sensitive input devices 32, 34 and 36 depending upon the mode in which the phone is operating. As is discussed more fully below, the mobile phone 10 can be configured to operate in both portrait and landscape orientations depending upon the relative positions of the flip assembly 16 and the intermediate assembly 16.

In one embodiment, the main PCBA is housed within the base assembly 14 and electrically connected to the battery 50, which provides the necessary power for operating the mobile phone 10. A connector establishes an electrical connection between the battery 50 and the adjacent PCBA. The PCBA may be connected to the various touch-sensitive input devices and/or displays with suitable flex circuitry. Alternatively, the PCBA may be connected to auxiliary PCBAs associated with the flip and intermediate assemblies by suitable flex circuitry.

Turning now to FIGS. 7-12, and with continued reference to FIGS. 2-6, an exemplary embodiment of the dual sliding hinge assembly 12 is provided. In the simplified diagrams shown in FIG. 7-12, the dual sliding hinge assembly 12 will be described in terms of a number of cooperative hinge plates. In this exemplary discussion, the dual sliding his assembly includes a first hinge plate 40, a second hinge plate 42, a third hinge plate 44, and a fourth hinge plate 46. Further, as is described more fully below, the dual sliding hinge assembly also includes a flip hinge portion 48, for example, rotationally coupling the third hinge plate 44 to the fourth hinge plate 46. In accordance with one embodiment, the dual sliding hinge assembly 12 may also include an additional flip hinge portion (e.g., a spring hinge) that is operative to rotationally couple the flip assembly to the base assembly. Alternatively, the base assembly and the flip assembly may be rotationally coupled by a separate hinge mechanism (e.g., a spring hinge). It will be appreciated that the exemplary hinge plates 40, 42, 44 and 46 may include any suitable sliding hinge plates or sliding hinge components, such as cooperative rail assemblies or the like. Further, it will be appreciated that the various hinge plates illustrated in FIGS. 7-12 are not intended to be limited to a particular geometry (e.g., not intended to be limited to a plate-type geometry). Further, the dual sliding hinge assembly (and the various portions of the hinge assembly) may be made of any suitable material, including, but not limited to, steel or another metal or plastic. In one embodiment, the first hinge plate may be formed integrally with the base assembly or the flip assembly and the fourth hinge plate may be formed integrally with the intermediate assembly.

Figure 7:
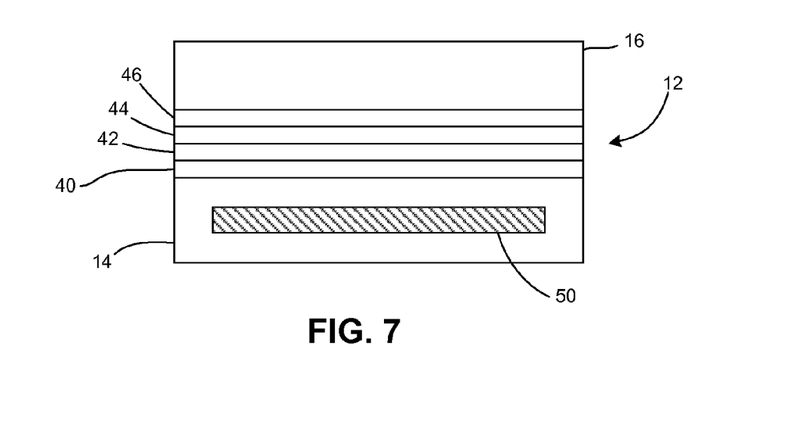
FIG. 7 is a sectional schematic view of a mobile telephone in a closed position.

For purposes of explanation, FIG. 7 shows the dual sliding hinge assembly 12 with the mobile phone in a closed configuration, while FIGS. 8-12 show the dual sliding hinge assembly 12 with the mobile phone in an open configuration.

Figure 8:
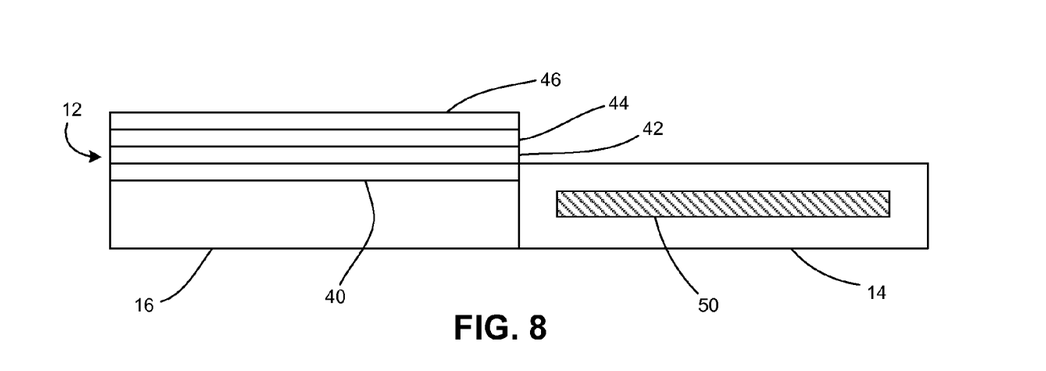
FIG. 8 is a sectional schematic view of the mobile telephone of FIG. 7 in an open position.
Figure 9:
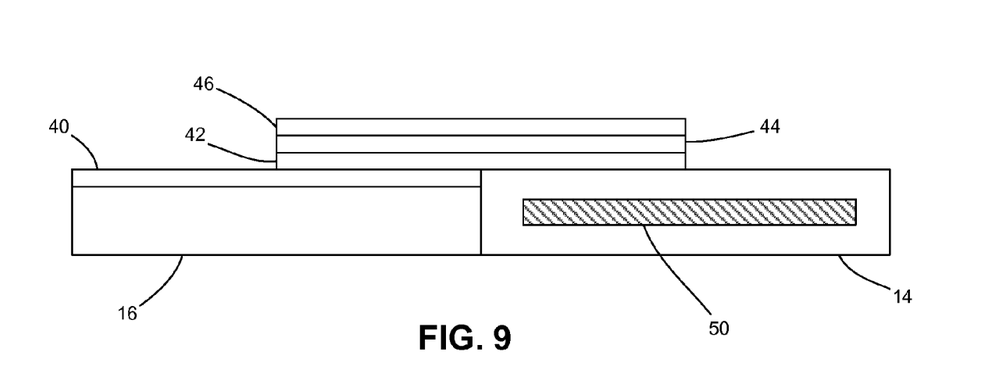
FIG. 9 is a sectional schematic view of the mobile telephone of FIG. 8 with an intermediate assembly slid along a first direction.

Once the mobile phone is in a fully open configuration, for example, with the flip assembly open to an angle of about 180 degrees relative to the base assembly (as shown in FIG. 8), and the intermediate assembly may be moved relative to the base assembly and the flip assembly along a first direction as shown in FIG. 9. The sliding motion along the first direction may be facilitated by the cooperative sliding relationship between the first hinge plates 40 and the second hinge plate 42. For example, the first and second hinge plates cooperate to facilitate sliding motion of the intermediate assembly from a position completely over the flip assembly to a position partially over the flip assembly and partially over the base assembly (e.g., in a position relatively centered over the flip assembly and the base assembly).

Figure 10:
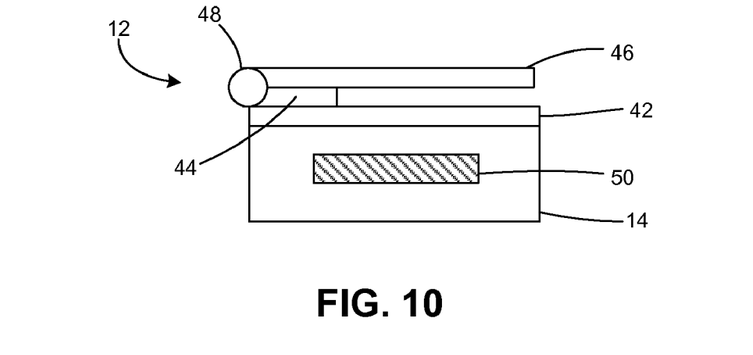
FIG. 10 is an end schematic view of the mobile telephone of FIG. 9.
Figure 11:
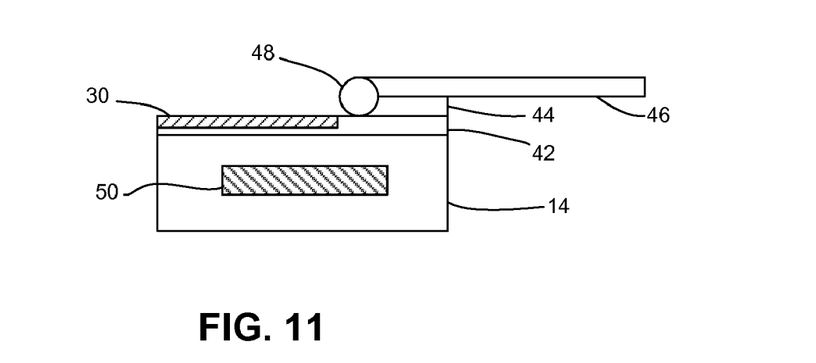
FIG. 11 is an end schematic view of the mobile telephone of FIG. 10 with the intermediate assembly slid along a second direction.
Figure 12:
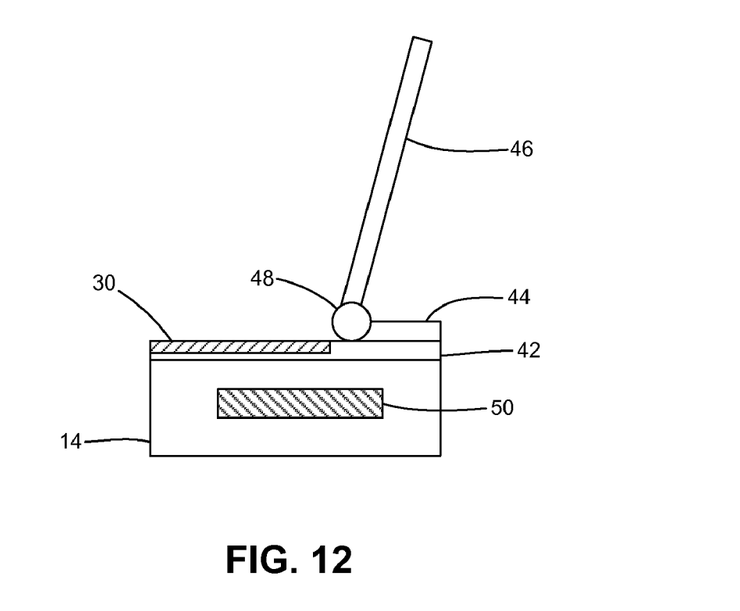
FIG. 12 is an end schematic view of the mobile telephone of FIG. 11 with the intermediate assembly rotated relative to the base and flip assemblies.

FIGS. 10-12 show exemplary end views of the mobile phone and the associated dual sliding hinge assembly 12. As shown in FIG. 10 and FIG. 11, once the intermediate assembly has been slid to a position relatively centered over the flip assembly and the base assembly, the dual sliding hinge assembly may facilitate further sliding motion along a direction perpendicular to the first direction (as shown in FIG. 11). In this manner, the second hinge plate 42 and the third hinge plate 44 cooperate to facilitate sliding of the intermediate assembly along the second direction. As shown in FIG. 11, sliding of the intermediate assembly along the second direction may reveal an auxiliary area 30 such as a keypad, a display or a touch-sensitive input device, then it is housed on top of, adjacent to, or with in the second hinge plate such that the auxiliary assembly 30 is revealed once the intermediate assembly is slid along the second direction.

Once the intermediate assembly has been slid along the second direction (e.g., by cooperative sliding engagement of the second and third hinge plates, the fourth hinge plate may be rotated relative to the third hinge plate by way of a rotational hinge element 48 that rotationally couples the third hinge plate 44 to the fourth hinge plate 46. It will be appreciated that it is not required for the intermediate assembly to be slid along the second direction before the intermediate assembly is rotated in a relatively upright position relative to the flip assembly and the base assembly. As shown in FIG. 12, when the intermediate assembly is slid along the second direction and further rotated into a relatively upright position, the user of the user of the mobile phone may be able to enter data via the auxiliary device 30 while viewing a relatively upright display coupled to be fourth hinge plate in a laptop-like configuration.

It will be appreciated that the various components of the dual sliding hinge assembly may be incorporated within the housings of the base assembly, the flip assembly and/or the intermediate assembly such that the dual sliding hinge assembly is not readily viewable by a user of the phone. For example, the various components of the dual sliding hinge assembly may be integrated into suitable cosmetic plastics. The various hinge plates of the dual sliding hinge assembly may include a spring or other resilient member that requires an initial force before allowing relative movement between the various cooperative hinge plates.

It will be appreciated that multiple use cases (and associated phone configurations) may be achieved by the design described above. In one embodiment, the phone may include three distinct displays 32, 34 and 36 on the "inside" of the mobile phone, each with a touch-sensitive input portion so that they may be used or otherwise configured as input devices. Further, the mobile phone may be configured to include an auxiliary display or input area 30 that is exposed when the intermediate assembly is slid along the second direction, optionally, with the display 36 rotated in a relatively upright position. When in a normal flip-open mode, display 36 within the intermediate assembly may be configured to function as a typical keypad (e.g., alphanumeric keypad and/or QWERTY keypad), and display 36 within the base is hidden. When the mobile phone is transitioned to a web/ multimedia mode (e.g., by opening the flip assembly and sliding the intermediate assembly relative to the base) all three touch-sensitive input surfaces 32, 34 and 36 are exposed (as well as possibly auxiliary area 30), and display 36 may switch to function as the main display, while displays 32 and 34 are configured to operate as input devices. In one embodiment, the transition of display 36 from keypad mode to main display mode may be triggered by an electromechanical switch is activated upon sliding movement of the intermediate assembly into a relatively centralized position. In this embodiment, the user may hold the mobile device in both hands in a landscape mode as the user navigates/operates the device with his/her thumbs. Of course, other use cases and configurations may be realized without departing from the scope of the present invention.

The provision of a mobile phone having a base assembly, and intermediate assembly and a flip assembly coupled by a dual sliding hinge assembly provides a mobile phone having enhanced functionality and versatility. For example, the provision of a dual sliding hinge assembly provides the conveniently sized form factor or footprint on the phone along with the enhanced control space/features and/or display space/features found in phones having larger form factors. Stated differently, the above-describe mobile phone provides the look and feel of a larger phone with more display area and/or control area with a smaller footprint often associated with clamshell and/or slider phones. Further, in a configuration where the intermediate assembly is slid along the first and second directions and rotated into a relatively upright position, the phone may be configured to have the look and feel of a mini laptop computer.

In addition, the provision of a dual sliding hinge assembly that couples a base assembly, intermediate assembly and flip assembly (with the base assembly, intermediate assembly and flip assembly having touch-input devices) provides for a versatile mobile phone that may be operated in a first mode (e.g., in a portrait orientation) for calling and simple messaging operations, and a second mode (e.g., in a landscape orientation) for web surfing, gaming and/or other multimedia operations. For example, in one embodiment, the flip assembly may be opened and the intermediate assembly may be slid to reveal touch-sensitive input device (and possibly triggering a transition to a multimedia mode), whereby touch-sensitive device 36 functions as the main display and touch-sensitive devices 32 and 34 (as well as any touch-sensitive input device within the auxiliary area 30) are configured as touch-sensitive control interfaces. In this configuration, the phone can operate in a "balanced mode" where a user can hold the device with both hands in a landscape mode having control areas on both sides of a relatively-centered main display. Other modes of operation may be realized without departing from the scope of the present invention.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is

1. A portable communication device comprising:
a base assembly;
a flip assembly coupled to the base assembly such that the flip assembly is rotatable relative to the base assembly; and
an intermediate assembly operatively coupled to the base assembly and the flip assembly by a dual sliding hinge assembly, wherein the dual sliding hinge assembly is configured to facilitate sliding movement between the intermediate assembly and the base assembly along a first direction and along a second direction perpendicular to the first direction,
wherein the dual sliding hinge assembly includes a first hinge plate coupled to a second hinge plate and configured for sliding movement between the second hinge plate and the first hinge plate along the first direction and a third hinge plate coupled to the second hinge plate and configured for sliding motion between the third hinge plate and the second hinge plate along a second direction perpendicular to the first direction.

2. The portable communication device of claim 1, wherein the dual sliding hinge assembly is configured to facilitate rotational movement between the intermediate assembly and the base assembly.

3. The portable communication device of claim 1, wherein the dual sliding hinge assembly is configured to facilitate rotational movement between the intermediate assembly and the base assembly when the intermediate assembly is slid along the second direction.

4. The portable communication device of claim 1, wherein the dual sliding hinge assembly includes a fourth hinge plate coupled to the third hinge plate and configured for rotational movement between the fourth hinge plate and the third hinge plate.

5. The portable communication device of claim 4, wherein the fourth hinge plate is coupled to the third hinge plate by a spring hinge.

6. The portable communication device of claim 4, wherein the fourth hinge plate is rotatable to an angle of up to about 90 degrees.

7. The portable communication device of claim 1, wherein the intermediate assembly includes at least one display.

8. The portable communication device of claim 1, wherein the intermediate assembly includes a touch-input device that is revealed when a portion of the intermediate assembly is slid along the second direction.

9. The portable communication device of claim 1, wherein the base assembly and the flip assembly each comprise a touch-sensitive input device.

10. The portable communication device of claim 9, wherein each touch-sensitive input device is a touch-sensitive display.

11. The portable communication device of claim 1, wherein the portable communication device is a mobile telephone.

12. A portable communication device comprising:
  a base assembly;
  a flip assembly; and
  an intermediate assembly;
  wherein the base assembly, the intermediate assembly and the flip assembly are operatively coupled by a dual hinge assembly, wherein the dual hinge assembly is configured to facilitate rotational movement between the base assembly and the flip assembly, sliding movement between the base assembly and the intermediate assembly along a first direction and along a second direction perpendicular to the first direction, and rotational movement of the intermediate assembly relative to the base assembly when the intermediate assembly is slid along the second direction.

13. A dual sliding hinge assembly for use in connection with a portable communication device, the dual sliding hinge assembly comprising:
  a first hinge plate coupled to a second hinge plate and configured for sliding movement between the second hinge plate and the first hinge plate along a first direction;
  a third hinge plate coupled to the second hinge plate and configured for sliding motion between the third hinge plate and the second hinge plate along a second direction perpendicular to the first direction; and
  a fourth hinge plate coupled to the third hinge plate and configured for rotational movement between the fourth hinge plate and the third hinge plate.

14. The dual sliding hinge assembly of claim 13, wherein the dual sliding hinge assembly is configured to facilitate rotation of the fourth hinge plate of about 90 degrees relative to the third hinge plate.

15. A portable communication device comprising:
  a first assembly; and
  a second assembly coupled to the first assembly by a dual sliding hinge assembly;
  wherein the dual sliding hinge assembly is configured to facilitate sliding movement between the first assembly and the second assembly along a first direction and along a second direction perpendicular to the first direction, and rotational movement of the second assembly relative to the first assembly when the intermediate assembly is slid along the second direction.

* * * * *